United States Patent [19]

Van Elferen

[11] Patent Number: 5,268,205

[45] Date of Patent: Dec. 7, 1993

[54] METHOD OF PROVIDING A HIGH-GLOSS COATING ON A POLYSTYRENE SUBSTRATE

[75] Inventor: Rutgerus H. M. Van Elferen, Oss, Netherlands

[73] Assignee: U.S. Philips Corporation, New York, N.Y.

[21] Appl. No.: 6,442

[22] Filed: Jan. 21, 1993

Related U.S. Application Data

[60] Division of Ser. No. 894,161, Sep. 2, 1992, Pat. No. 5,218,028, which is a division of Ser. No. 784,726, Oct. 28, 1991, abandoned, which is a continuation of Ser. No. 550,249, Jul. 6, 1990, abandoned, which is a continuation of Ser. No. 345,400, May 1, 1989, abandoned.

[30] Foreign Application Priority Data

May 19, 1988 [NL] Netherlands .......................... 8801292

[51] Int. Cl.$^5$ ................................................ B05D 7/02
[52] U.S. Cl. ................................ 427/393.5; 428/424.8
[58] Field of Search ................... 427/393.5; 428/424.8

[56] References Cited

U.S. PATENT DOCUMENTS

| | | | |
|---|---|---|---|
| 4,020,216 | 4/1977 | Miller | 524/513 |
| 4,235,766 | 11/1980 | Kuijper | 525/131 |
| 4,560,494 | 12/1985 | Druetzler | 525/127 |

Primary Examiner—Joseph L. Schofer
Assistant Examiner—R. H. Delmendo
Attorney, Agent, or Firm—Norman N. Spain

[57] ABSTRACT

A high-gloss coating of a polystyrene object is obtained by spraying, on the object, a lacquer having a potlife of at least 16 hours and which is obtained by using a tertiary alcohol and diacetone alcohol as a solvent, and contains a polyisocyanate, a polyhydroxyacrylate and a thermoplastic acrylate resin as an adhesive promoting agent.

1 Claim, No Drawings

METHOD OF PROVIDING A HIGH-GLOSS COATING ON A POLYSTYRENE SUBSTRATE This is a division of application Ser. No. 07/894,161, filed Sept. 2, 1992, now U.S. Pat. No. 5,218,028, which is a division of application Ser. No. 07/784,726, filed Oct. 28, 1991, now abandoned, which is a continuation of application Ser. No. 07/550,249, filed Jul. 6, 1990, now abandoned, which is a continuation of application Ser. No. 07/345,400, filed May 1, 1989, now abandoned.

BACKGROUND OF THE INVENTION

The invention relates to a polyurethane lacquer which is suitable, in particular, for the high-gloss coating of polystyrene, said lacquer being on the basis of polyhydroxyacrylate and polyisocyanate and containing a catalyst and a tertiary alcohol.

The invention also relates to a spray diluent for such a polyurethane lacquer.

The invention further relates to a method of lacquer spraying polystyrene-containing substrates, using a polyurethane lacquer, containing a polyhydroxyacrylate, a polyisocyanate, a catalyst and tertiary alcohol.

Industrial applications of polystyrene are, among others, supports for household appliances, housing for audio and video equipment, shavers and wheel covers for cars. Polystyrene is often used in the form of so-called high-impact polystyrene, in which a few percent of rubber are mixed with the polymer. For many of these applications it is required that the surface of the polystyrene is provided with a hard, properly adhering decorative coating. This coating can be obtained by applying a lacquer, preferably, by spraying.

Physically dryable lacquers are not very attractive because of their high content of organic solvents. Owing to tightened environmental requirements the emission of solvents has to be minimized. Also since there is no crosslinking in physically drying lacquers, the resistance to wear and the chemical resistance of the coating manufactured by means of these lacquers are often insufficient.

Lacquers which are more suitable are two-component lacquers, for example polyyrethane lacquers, which are cured by means of crosslinking and which contain relatively few organic solvents.

Polystyrene is attacked by many common solvents, such as ketones and ethers, so that an object made from polystyrene is subject to deformation and the surface is attacked in such a way that it attains an undesirably mat appearance.

A polyurethane lacquer on the basis of polyhydroxyacrylate and polyisocyanate is known from European Patent Application no. 1304. The lacquer described therein contains in addition to a tertiary alcohol also 18–60% by weight of one or more other solvents such as ketones or ethers. This lacquer is unsuitable for use on polystyrene, because the latter solvents attack the polystyrene, which leads to the above-mentioned disadvantages. Additionally the lacquer described therein contains no adhesion-improving substance so that for many applications a primer has to be provided first on the substrate, which implies an additional process step. This is generally referred to as a two-layer paint system.

SUMMARY OF THE INVENTION

It is an object of the invention to overcome the above-mentioned disadvantages and provide a single-layer two-component polyurethane lacquer having a potlife of at least 16 hours, which can suitably be used for applying a properly adhering coating to polystyrene, and, moreover, which can be applied by means of spraying.

This object is achieved in accordance with the invention by a polyurethane lacquer as described in the opening paragraph, characterized in that the lacquer also contains diacetone alcohol and an adhesion-improving substance. Solvents which do not attack polystyrene are aliphatic hydrocarbons and alcohols. Aliphatic hydrocarbons are not suitable because polymeric components of the lacquer do not dissolve in such solvents. Primary and secondary alcohols react with polyisocyanate and, thus, block the formation of polyurethane. Consequently, lacquers comprising these alcohols must be sprayed soon after they have been prepared. Tertiary alcohols do not react with polyisocyanate because of steric hindrance of the hydroxyl group by the alkyl groups and consequently they can suitably be used as a solvent for a polyurethane lacquer for polystyrene. In addition to a tertiary OH group, diacetone alcohol (4-hydroxy-4-methylpentanone-2) also contains a ketone group. This ketone group increases the solubility of the polyhydroxyacrylate and the polyisocyanate and also has the favourable property that, unlike other ketones, it does not attack polystyrene. Moreover, diacetone alcohol has the advantage that it evaporates more slowly than other tertiary alcohols, so that during and after its application onto a substrate the lacquer exhibits a better levelling. In order to increase the solubility of the polyhydroxyacrylate and the polyisocyanate, low-molecular polymers are used. A suitable low-molecular polyhydroxyacrylate is marketed by the firm of Synthese under the trade name of Setalux, type 1752X 65. A suitable low-molecular polyisocyanate is marketed by Bayer under the trade name of Desmodur, type N 3300. In order to obtain a desirable evaporation rate and hence a desirable drying time, the lacquer comprises tertiary alcohols, such as tertiary butanol or tertiary pentanol, in addition to diacetone alcohol. The quantity of tertiary alcohol, unlike diacetone alcohol, ranges between 25 and 60% by weight. If only diacetone alcohol is used as the tertiary alcohol the drying time of the lacquer becomes unpracticably long. In addition to the said tertiary alcohols other tertiary alcohols may alternatively be used, the maximum number of C-atoms being approximately 15, provided that for practical reasons the melting point of the tertiary alcohol remains below 30° C. An additional and important further advantage of the lacquer according to the invention is that the flash point can be formulated at a temperature above 21° C. A monolayer two-component system which is very suitable for the high-gloss lacquering of polystyrene can be obtained by adding an adhesion-improving substance, such as an acrylate resin, to this lacquer.

DETAILED DESCRIPTION OF THE INVENTION

A further object of the invention is to provide a spray diluent for a polyurathane lacquer in accordance with the invention.

This object is achieved in accordance with the invention by a spray diluent, characterized in that the diluent contains a tertiary alcohol and diacetone alcohol. These solvents have the advantages and properties mentioned hereinbefore, namely, they do not attack polystyrene; they do not react with polyisocyanate and can have a flash point exceeding 21° C. if, for example, tertiary pentanol is used as a solvent.

A further object of the invention is to provide a method of lacquer spraying of substrates containing polystyrene, in which a polyurethane lacquer and a spray diluent, both in accordance with the invention, are sprayed on the substrate, in the usual manner, after they have been mixed together.

An embodiment of the polyurethane lacquer in accordance with the invention is characterized in that the adhesion-improving substance contains a thermoplastic acrylate resin. These acrylate resins adhere well to many types of substrates, such as metals and synthetic resins, and can be dissolved in the polyurethane lacquer in accordance with the invention.

A preferred embodiment of the polyurethane lacquer in accordance with the invention is characterized in that the thermoplastic acrylate resin contains polymethyl methacrylate. Such an acrylate resin is marketed by the firm of Röhm under the trade name of Plexigum, type M 345.

An embodiment of the polyurethane lacquer in accordance with the invention is characterized in that the lacquer contains at most 5% by weight of polymethyl methacrylate. A higher polymethyl methacrylate content adversely affects the gloss and the levelling of the lacquer.

A polyurethane lacquer in accordance with the invention is further characterized in that the lacquer contains at least 5 and at most 17% by weight of diacetone alcohol. A higher content of these alcohols leads to undesirably long drying times due to the slow evaporation. Below 5% by weight of diacetone alcohol the levelling rate is too low.

A polyurethane lacquer in accordance with the invention is further characterized in that the lacquer contains at most 10% by weight of xylene and at most 15% by weight of butyl acetate. These solvents are often necessary to increase the solubility of the polyhydroxyacrylate and the polyisocyanate. If smaller concentrations are used no attack of the polystyrene takes place. Ethyl acetate cannot be used as a solvent if the flash point of the lacquer is to exceed 21° C.

A special embodiment of the polyurethane lacquer in accordance with the invention is characterized in that the lacquer contains as a catalyst a mixture of calcium naphthenate and dibutyl tin dilaurate in a concentration of maximally 0.5% by weight. If such a catalyst is used, the drying time of the lacquer amounts to half an hour at 50° C. A higher concentration of the catalyst adversely affects the adhesion of the lacquer. To compensate for this, more thermoplastic acrylate resin must be added to the lacquer as an adhesion-improving substance, yet, as stated above, the gloss and the levelling of the lacquer will be adversely affected. If the lacquer comprises no catalyst the drying time amounts to many hours.

Levelling-agents such as, for example, Additol XL 490 marketed by Hoechst, may further be added to the lacquer. Moreover, inorganic and organic pigments may also be added to the lacquer, as well as fillers and pigment-dispersing agents. In order to obtain the so-called metallic lacquers, metal suspensions can be added, for example of aluminum.

A further object of the invention is to provide a spray diluent for a polyurethane lacquer in accordance with the invention.

This object is achieved in accordance with the invention by a spray diluent, characterized in that the diluent contains a tertiary alcohol and diacetone alcohol. These solvents have the advantages and properties mentioned hereinbefore, namely, they do not attack polystyrene; they do not react with polyisocyanate and can have a flash point exceeding 21° C. if, for example, tertiary pentanol is used as a solvent.

A further object of the invention is to provide a method of lacquer spraying substrates containing polystyrene, in which a polyurethane lacquer and a spray diluent, both in accordance with the invention, are sprayed in the usual manner after they have been mixed.

The invention will now be explained in more detail by means of the following exemplary embodiment:

The following solutions were prepared:

Solvent (solution A):
76 kg of tertiary pentanol
12 kg of butyl acetate
12 kg of diacetone alcohol.

Catalyst solution (solution B):
92.65 kg of solution A
7 kg of calcium naphthenate
0.35 kg of dibutyl tin dilaurate.

Solution A and calcium naphthenate were mixed by stirring; subsequently dibutyl tin dilaurate was added.

Adhesive (solution C):
19 kg of Plexigum M 345 (thermoplastic methyl methacrylate resin)
17 kg of butyl acetate
59 kg of solution A
5 kg of diacetone alcohol.

The solution was heated to 60° C. and stirred until the acrylate resin was dissolved.

Spray diluent (solution D):
44 kg of solution A
28 kg of diacetone alcohol
28 kg of butyl acetate.

The following clear coating was prepared:
65.5 kg Setalux 1752 XS 65 (polyhydroxyacrylate)
26.4 kg of solution C (adhesive)
12.8 kg of diacetone alcohol
4.0 kg of solution B (catalyst)
0.3 kg of Additol XL 490 (flow-promoting agent)

100 parts by weight of this lacquer are mixed with 18 parts by weight of Desmodur N 3300 (polyisocyanate). By means of 25 parts by weight of solution D, the viscosity of the lacquer was rendered suitable for spraying. Plexigum M 345 is marketed by the firm of Röhm; Setalux 1752 XS 65 is marketed by the firm of Synthese; Desmodur N 3300 is marketed by Bayer and Additol XL 490 is marketed by Hoechst.

The lacquer viscosity for spraying was measured in accordance with DIN 53211 by means of a DIN-cup no. 4 and amounted to 22 seconds (efflux time). The flash point is >21° C.

The lacquer was sprayed, in a customary manner, on test boards of a moldflown high-impact polystyrene. After the spraying process the test boards were dryed at 50° C. for 30 minutes; subsequently, for 7 days at 23° C. and a relative humidity of 50%. This drying time was selected because in general a poor adhesion does not show until after a few days. The results of the test are listed in the Table below:

| layer thickness (in accordance with ISO 2808) | 30 μm |

| | |
|---|---|
| gloss (in accordance with ISO 2813) | 96 |
| adhesion (ISO 2409) | Gt-O |
| resistance to ethanol | better than 200 rubs |
| resistance to white spirit | better than 200 rubs |
| scratch resistance | satisfactory |
| hardness (Konig, in accordance with ASTM 4366) | 52 s. |
| art. sweat (2.6 DIN 53160) | RAP-O |
| art. sweat (8.8 DIN 53160) | RAP-O |
| potlife | 20 hours |
| drying time: sand dry (ASTM D 1640) | 30 min |
| touch dry | 90 min |
| "dried trough" | 240 min |
| adhesion after dry heat test (IEC 68-2-2B6) | Gt-O |
| adhesion after cold storage (IEC 68-2-1-AB) | Gt-O |

The adhesion was measured by means of the so-called diamond scratching test (Gitterschnitt) in which a square pattern is scratched into the lacquer and an adhesive tape is provided on the scratches and subsequently removed. The number of lacquer squares which is removed from the substrate is a measure for the adhesion. If all squares remain on the substrate the adhesion is very good (Gt-O). The resistance to chemicals was determined by rubbing with a cloth immersed in the relevant substance. After rubbing 200 times no attack of the lacquer could be established. The resistance to scratching was determined by means of the so-called nail test (mar resistance).

I claim:

1. A method of providing a high-gloss coating on a polystyrene substrate comprising applying a layer of a polyurethane forming lacquer on a surface of said polystyrene substrate, said lacquer comprising 25-60% by weight of a tertiary alcohol selected from the group consisting of tertiary butanol and tertiary pentanol, 5-17% by weight of diacetone alcohol, a polyhydroxyacrylate, a polyisocyanate and, as an adhesion improving substance, a thermoplastic polymethyl methacrylate and drying the layer of said lacquer.

* * * * *